United States Patent [19]
Stephens

[11] Patent Number: 5,427,404
[45] Date of Patent: Jun. 27, 1995

[54] STIFF BEAM SUSPENSION SYSTEM

[75] Inventor: Donald L. Stephens, LaConner, Wash.

[73] Assignee: Paccar Inc., Bellevue, Wash.

[21] Appl. No.: 260,017

[22] Filed: Jun. 15, 1994

[51] Int. Cl.$^6$ ............................................. B60G 11/26
[52] U.S. Cl. ................................... 280/712; 280/720; 267/45; 267/229
[58] Field of Search ............... 280/711, 712, 713, 718, 280/720, 725; 267/44, 45, 41, 229, 241

[56] References Cited

U.S. PATENT DOCUMENTS

| | | | |
|---|---|---|---|
| 2,869,891 | 1/1959 | Venditty et al. | 280/713 |
| 3,038,715 | 6/1962 | Davidson et al. | 267/45 |
| 3,154,321 | 10/1964 | McLean | 280/713 |
| 3,434,707 | 3/1969 | Raidel | 267/31 |
| 3,630,541 | 12/1971 | Carlson et al. | 280/713 |
| 3,664,452 | 5/1972 | Schaeff | 180/349 |
| 3,802,718 | 4/1974 | Schaeff | 280/712 |
| 4,027,898 | 6/1977 | Steen | 280/720 |
| 4,033,608 | 7/1977 | Sweet et al. | 280/711 |
| 4,166,640 | 9/1979 | Van Denberg | 280/711 |
| 4,293,145 | 10/1981 | Taylor | 280/704 |
| 4,379,572 | 4/1983 | Hedenberg | 280/711 |
| 4,759,567 | 7/1988 | Allen | 280/713 |
| 4,858,949 | 8/1989 | Wallace et al. | 280/713 |
| 5,037,126 | 8/1991 | Gottschalk et al. | 280/688 |
| 5,046,752 | 9/1991 | Stephens et al. | 280/713 |
| 5,186,485 | 2/1993 | Orr et al. | 280/678 |

FOREIGN PATENT DOCUMENTS

0413318A1 2/1991 European Pat. Off. .

Primary Examiner—Margaret A. Focarino
Assistant Examiner—Paul N. Dickson
Attorney, Agent, or Firm—Seed and Berry

[57] ABSTRACT

A suspension system in which a relatively lightweight stiff beam connects the axle to the frame via a connection at one end with a resilient link that allows vertical motion of the end of the stiff beam and transverse motion of the stiff beam to reduce the lateral loads between the axle and the beam and between the beam and the frame rail connection to enable the suspension to be made of fewer and lighter weight components for improved payloads. In the preferred embodiment, the connection between the stiff beam and the frame rail is a C-shape spring allowing the forward connection of a horizontal fore aft link to be moved farther forward to give an increased clearance to the wheel, thereby reducing potential interference between the wheel and the horizontal link and bushing assembly at its forward end.

28 Claims, 5 Drawing Sheets

STIFF BEAM SUSPENSION SYSTEM

TECHNICAL FIELD

This invention relates to a suspension for vehicles and particularly to a suspension system which allows freedom of movement of the axle of the vehicle to provide a lighter weight suspension.

BACKGROUND OF THE INVENTION

Vehicle suspensions have commonly used heavy beams or beams and leaf spring assemblies to resiliently support the axle relative to the frame and to carry loads on the axle fore and aft to frame-mounted supporting devices. The same beams or beams mad spring assemblies also are used to control the amount of roll a vehicle experiences when the vehicle, for example, travels around a corner. Thus, the same assembly is used to provide both a beam function and a roll springing function. As a result, conventional assemblies are very heavy and require strong components that must withstand large loads.

These assemblies are pivotally connected at one end to a bracket rigidly mounted on the frame of the vehicle in a manner such that they rotate about a fixed pivot relative to the frame when the axle moves vertically. However, the vertical movement of the axle is caused by rocking of the axle about a longitudinal fore and aft axis as the wheels on opposite sides of the vehicle go up and down over irregularities in the road surface such that the ends of the axle also move laterally, relative to the frame along a transverse axis. As a result, the connection between an axle of the suspension and the beams or the leaf spring of the suspension to the frame requires several connection components that must be made with very heavy-duty, strong material to withstand large lateral and twisting or torque loads caused by the rocking of the axle. The connection components attached to the beam, such as a spring steel beam, or to the beam and spring combination create "dead" areas of the spring portions, thereby resulting in heavy spring portions that are not fully utilized. In addition, the beams and leaf springs must also be made of heavy-duty, strong material to withstand the large lateral and torque loads. As a result, the convention suspensions are very complex and heavy.

Particularly in large bulk carrying vehicles, such as those which carry sand, gravel, or other heavy payloads, the increased weight required to make the suspension strong enough to withstand the large lateral and torque loads caused by the axle being raised at one end results in excess weight of the vehicle, thereby reducing the maximum payload for the vehicle.

SUMMARY OF THE INVENTION

The present invention involves a unique lightweight suspension using a rigid beam that is resiliently connected at one end, preferably its forward end, to the vehicle frame by a vertical link. This resilient connection between the stiff suspension beam and the frame enables the forward end of the beam to move laterally along the transverse axis and vertically along a vertical axis as the axle rocks about the longitudinal fore and aft axis. As a result, the forward end of the stiff beam suspension has freedom of motion in at least two directional axes, thereby reducing the loads on the stiff beam and on the connections between the beam and the axle and the beam and the forward linkage. Accordingly, the beam and the connections do not have to be strong enough to withstand the large lateral and torque loads experienced by the prior art. This allows the beam and the axle connection to be made of lighter weight material, thus increasing the maximum payload of the vehicle. The beam is also connected to the frame and axle with fewer connection components so as to further reduce the weight of the suspension and increase the maximum payload of the vehicle.

DETAILED DESCRIPTION OF THE INVENTION

Figure 1:
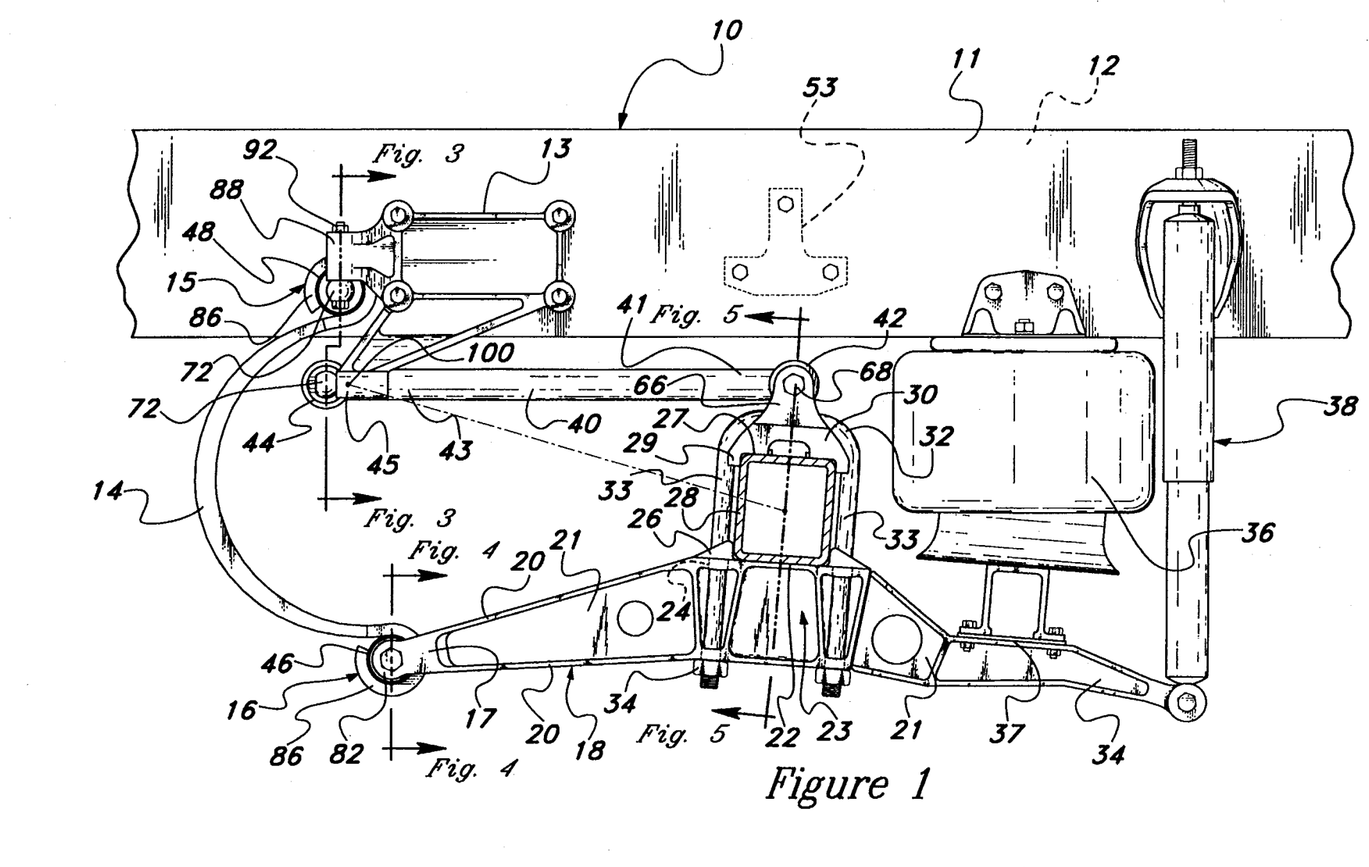
FIG. 1 is a side elevation of a suspension system embodying the principles of the invention.
Figure 2:
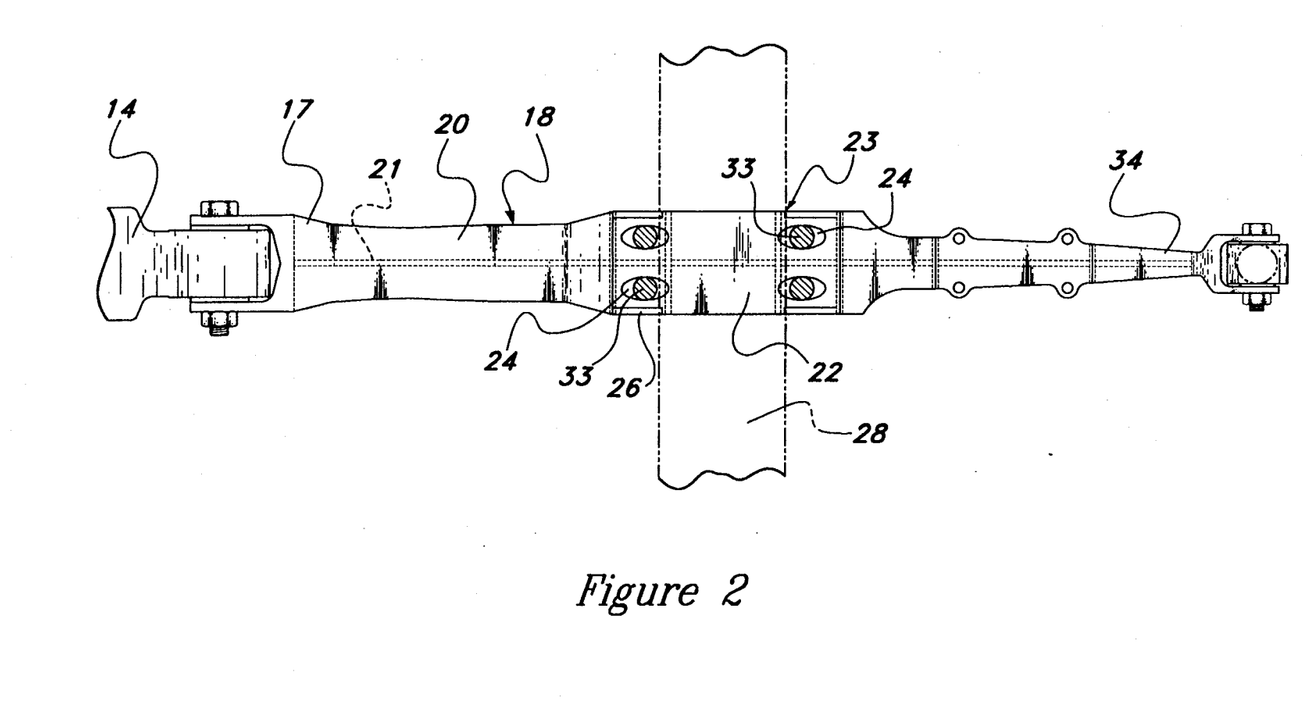
FIG. 2 is a fragmentary plan of a portion of the invention of FIG. 1.

FIG. 1 illustrates a vehicle frame 10 forming one of the frame rails 11 with an opposite frame rail 12 on the opposite side of the vehicle, as is well known. Connected to the frame rail 11 is a bracket 13 bolted to the frame rail in a conventional maimer. A resilient vertical link 14 is pivotally connected to the bracket assembly at an upper end 15 and pivotally connected at its opposite lower end 16 to a forward end 17 of a stiff or rigid I-beam 18.

The rigid beam 18 is an elongated member having upper and lower flanges 20 with a central web 21 extending therebetween. At its central area 23 between the forward end 17 and rearward end 34, the beam is provided with a flat axle supporting surface 22 and U-bolt openings 24. A set of ears 26 are integrally extending upward from the flat supporting surface to form a seat portion that is adapted to position a tubular axle 28 directly onto the flat supporting surface of the beam, as is shown in FIG. 1. The flat supporting surface eliminates the need for additional components, such as heavy bracketry between the axle and the beam, thereby reducing the weight of the suspension system.

Figure 5:
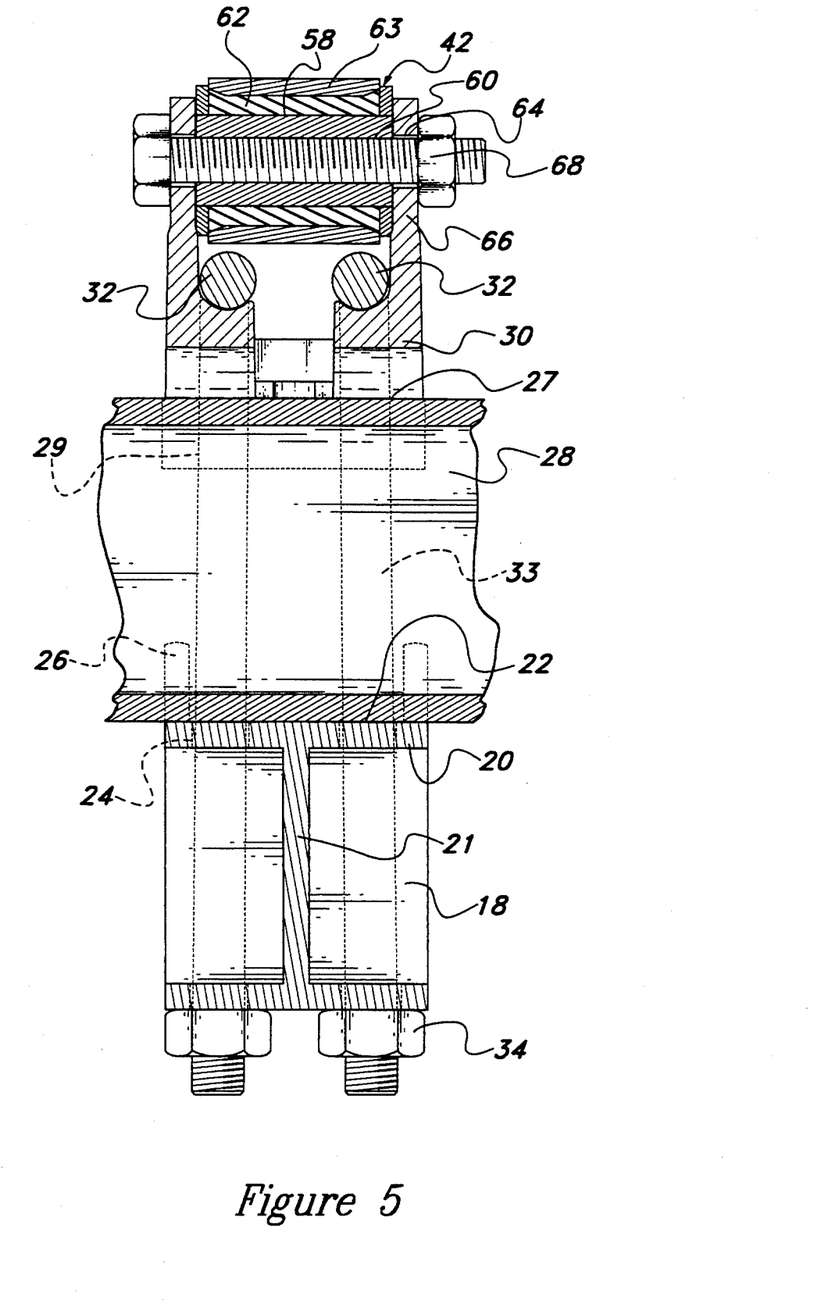
FIG. 5 is a vertical section taken along the line 5—5 of FIG. 1.

As best seen in FIGS. 1 and 5, an axle bracket 30 is positioned on top of the axle 28 directly above the flat support surface 22 of the rigid beam 18. The axle bracket has a flat axle engaging surface 27 that sets onto the axle and integral downwardly extending side portions 29 that engage the fore and aft sides of the axle to position the bracket over the axle. A set of two U-bolts 32 are positioned over the axle bracket and the axle, thereby encircling them. Legs 33 of the U-bolts extend downward from the axle bracket adjacent to the fore and aft sides of the axle, pass through the openings 24 in the rigid beam, and are secured in position by nuts 34 that clamp directly to the rigid beam, thereby securely fastening the axle to the beam. This arrangement of the nuts 34 being clamped directly to the rigid beam alleviates the need for a clamp plate or the like that would span the width of the beam and carry loads from the U-bolts to the beam.

It is a unique feature of this invention that the ability of the forward end 17 of the rigid beam 18 to move transversely and vertically relative to the frame rail 11 allows the connection between the axle and the beam to be made so the axle rests directly on the flat supporting surface 22 of the beam, rather than having intermediary additional support structure for connecting the beam to the axle. As such, fewer connecting components are needed so the suspension weighs less. The axle bracket also can be made of lighter weight material because of reduced stresses on this connection, as discussed in greater detail below, which provides the vehicle with an increased maximum payload.

As shown in FIG. 1, at the rearward end 34 of the rigid beam 18 is a conventional airbag 36 or other spring rat is connected to a flat receiving portion 37 on top of the beam and to the frame rail 11 in a conventional manner. In addition, a conventional shock absorber 38 is connected between the rear end of the beam and the frame. The airbag and shock absorber attach directly to the rigid beam so additional parts such as connecting brackets or the like are eliminated. The airbag and shock absorber act, in combination with the resilient vertical link, to resiliently support the frame on the axle housing and to dampen vibrations transmitted from the axle to the suspension.

A horizontal link 40 is pivotally connected at its rear end 41 to the top of the axle bracket 30 by a resilient bushing 42 and conventional fasteners that extend through the bushing and the axle bracket. The forward end 43 of the horizontal link is connected to a downwardly extending lower portion 45 of the support bracket 13 by another resilient bushing 44 and conventional fasteners that extend through the bushing pin and the bracket lower portion. Similarly, the forward end 17 of the rigid beam 18 is connected to the lower end 16 of the vertical link 14 by a resilient bushing 46 and conventional fasteners, and the upper end 15 of the vertical link is connected to the bracket 13 by a rubber resilient bushing 48 and conventional fasteners.

Specific details of the bushing and the connections identified above will now be described. The resilient bushing 42 is integrally attached to the rear end 41 of the horizontal link 40. As best seen in FIG. 5, the bushing has a cylindrical metal core 58, an aperture 60 extending through the core along its longitudinal axis, a layer 62 of resilient, durable rubber surrounding the core and a metal sleeve 63 surrounding the rubber layer. The bushing 42 fits between two integral, upwardly extending side panels 66 of the axle bracket 30. The aperture 60 coaxially aligns with similarly sized apertures 64 in each of the side panels so the conventional fastener 68 can pass through the side panels and bushing and be tightened against the side panels, thereby securely and pivotally attaching the horizontal link to the top of the axle bracket and the axle.

Figure 3:
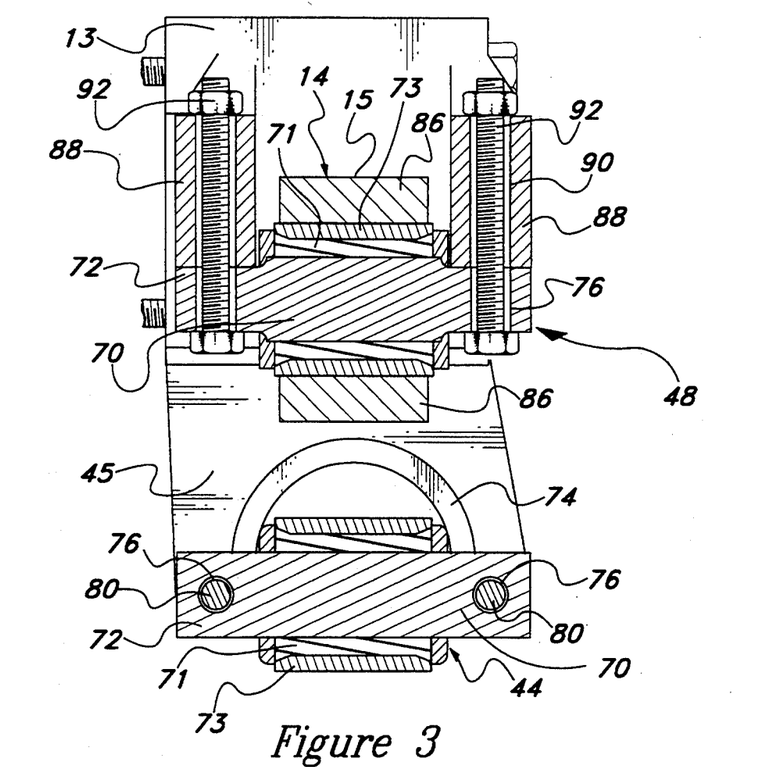
FIG. 3 is a vertical section taken along the line 3—3 of FIG. 1.

The resilient bushing 44 is integrally connected to the forward end 43 of the horizontal link 40. As best seen in FIG. 3, the bushing 44 has a cylindrical metal pin 70 that is the core of the bushing with a layer 71 of resilient, durable rubber surrounding the core, and a metal sleeve 73 surrounding the rubber layer. The horizontal link, which is preferably a cylindrical rod, extends under a semi-cylindrical segment 74 of the lower portion 45 of the bracket 13 and outer portions 72 of the pin 70 abut the forward side of the bracket's lower portion. Apertures 76 in each of the outer portions 72 of the pin 70 coaxially align with apertures in the bracket's lower portion and a conventional fastener 80 passes through the apertures and pivotally secures the horizontal link 40 to the bracket 13. Accordingly, the horizontal link 40 can pivot at its forward and rear ends, thereby allowing vertical movement of the axle 28, and the horizontal link prevents the axle from moving fore and aft in the longitudinal direction.

Figure 4:
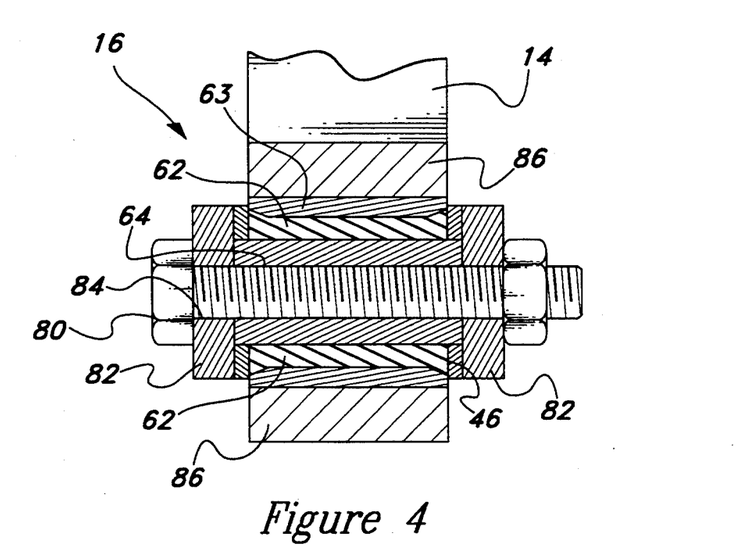
FIG. 4 is a vertical section taken along the line 4—4 of FIG. 1.

As shown in FIG. 1, the vertical link 14 of the preferred embodiment is a C-shaped spring, and the lower end 16 of the C-spring has a curved segment 86 that wraps around the resilient bushing 46. As best seen in FIG. 4, the resilient bushing 46 has a similar construction to the resilient bushing 42 at the rear end of the horizontal link 40 as described above. The curved segment 86 securely engages the metal sleeve 63 of the bushing. The lower end of the vertical link and the bushing 46 fit between two forwardly extending, integral panels 82 on the forward end of the rigid beam that form a receiving area, such that the vertical link is perpendicularly oriented to the front end of the beam. A conventional fastener 80 passes through coaxially aligned apertures 84 in the integral panels and the aperture 64 in the bushing. As such, the lower end of the vertical link pivotally connects to the forward end of the rigid beam.

As best seen in FIG. 3, the upper end 15 of the vertical link 14 also has a curved segment 86 that wraps around the resilient bushing 48. The resilient bushing 48 has a similar construction as the resilient bushing 44 at the forward end of the horizontal link 40 and the same reference numbers will be used to identify similar elements. The curved segment 86 securely engages the metal sleeve 73 of the resilient bushing 48. The upper end of the vertical link and the bushing 48 are positioned adjacent to the forward end of the bracket 13 so the outer portions 72 of the pin 70 are positioned against two side plate portions 88 of the bracket, with the curved segment 86 of the vertical link between the side plate portions. The apertures 76 in the pin 70 align with apertures 90 in the side plate portions of the bracket, and conventional fasteners 92 extend through the apertures and pivotally attach the upper end of the vertical link to the bracket.

Figure 6:
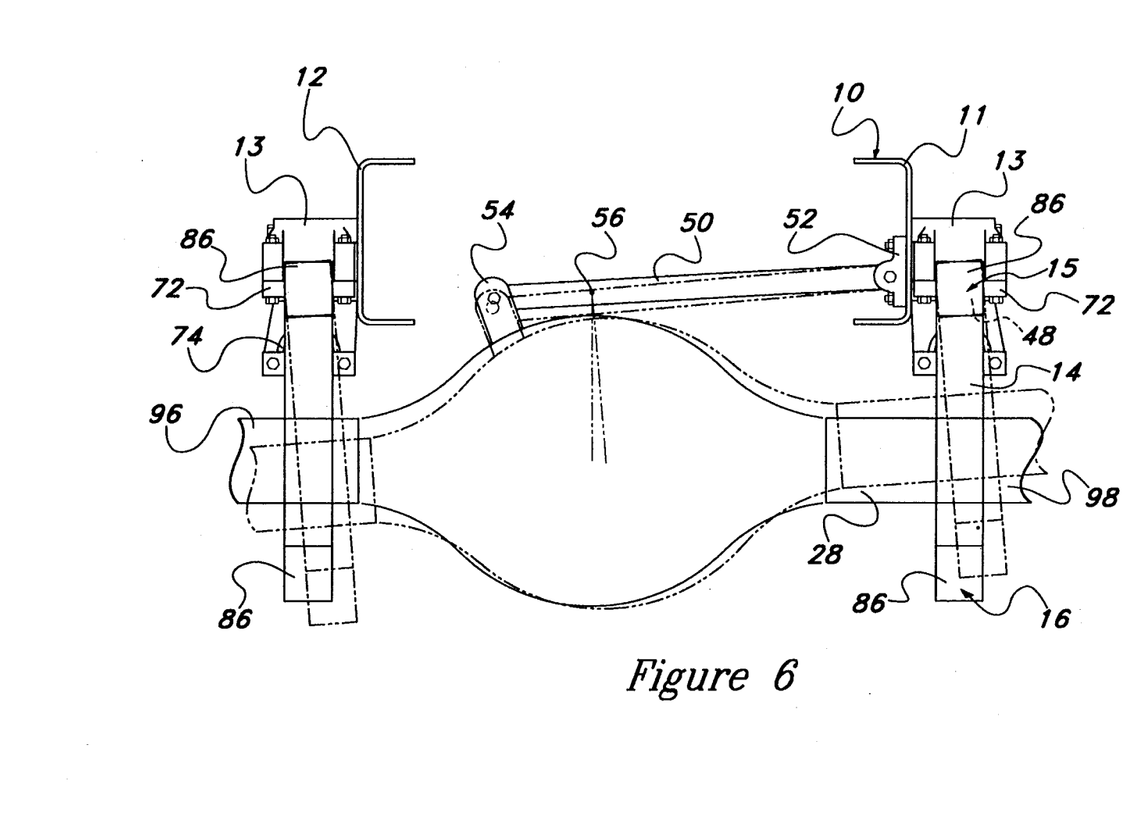
FIG. 6 is a side elevation looking from the rear of the vehicle showing schematically the movement of the axle and the linkage system of this invention.

The rubber layer 71 of the bushing 48 creates a resilient interface between the pin 70 and the curved segment 86 of the vertical link 14. The resilient interface allows the vertical link to pivot at its upper end 15 such that the lower end 16 will move laterally along a transverse axis perpendicular to the longitudinal axis of the beam 18, as best shown in FIG. 6. The resilient rubber layer compresses as necessary to allow the vertical link to pivot at the upper end. As a result, the vertical link allows the front end of the rigid beam to move along the transverse axis when the axle 28 rocks. The lower end 16 of the vertical link remains in a perpendicular relationship with the front end of the beam because of kinematics of the link 14 mounting location.

As indicated above, the resilient vertical link 14 is a vertically oriented C-shaped spring having, for example, a spring rate of approximately. 9,000 lb/inch, and positioned so the open concave portion of the C-spring faces rearwardly. The spring rate of the vertical link is selected to distribute the loads among the wheels while the vehicle travels over uneven ground, while maintaining sufficient roll stiffness. If the spring rate is too high, the suspension will not reasonably distribute loads, and if the spring rate is too small, the suspension will not have a sufficient roll stiffness. The vertical link is preferably a C-spring, although other vertical links may be used to achieve the most beneficial combination of load distribution and roll stiffness.

The vertical link 14 provides the spring function of the suspension system, so the rigid beam 18 does not have to provide some or all of the spring function. Thus, the rigid beam can be a deep and lightweight beam without concern for its resiliency. The lightweight rigid beam thus further reduces the weight of the suspension system. The C-spring is positioned so the forward end 43 of the horizontal link 40 extends into the concave portion forward beyond a line extending between the upper and lower ends 15 and 16 of the C-spring, as shown in FIG. 1. The resilient bushing 44 at the forward end 43 of the horizontal link 40, and the outer portions 72 of the pin 70 extending outward therefrom are positioned as far forward as possible, away from the axle. Accordingly, clearance between the protruding pin and the wheel attached to the axle is increased. If, however, the horizontal link were shorter, the pin would be inwardly adjacent to the thickest part of the tire, thereby substantially increasing potential interference between the wheel and the pin.

The location of the horizontal link 40, being coupled to the top of the axle bracket 30, extending forwardly just under the frame rail 11, and connecting to the bracket 13, as seen in FIG. 1, is substantially higher as compared to fore and aft torque rods of conventional trailing arm suspension systems. As a result, the connection between the bracket 13 and horizontal link is close to the frame rail, so the length of the moment arm of the bracket 13 is short. The horizontal link is subject to fore and aft loads up to 15,000 lbs, so the bending forces transmitted to the bracket from the short moment arm are substantially reduced from bending forces experienced by conventional trailing arm suspensions. These reduced bending forces allow the frame bracket to be a lighter weight component, which allows for increased maximum payload capacity of the vehicle.

As shown FIG. 6, a transverse rod 50 is pivotally connected to the frame rail 11 by a conventional bushing and bracket assembly 52 and to the top 94 of the axle in a conventional manner by a second bushing and bracket assembly 54. The transverse rod 50 is generally transverse to the vehicle frame rail 11. The transverse rod 50, being pivotally connected to the frame rail and axle, allows the axle to move along the vertical axis and prevents the axle from moving along the lateral axis, except as a result of the axle rocking, and thereby causing the ends of the axles to move vertically and laterally through an arc.

An advantage of the inventive suspension can be seen by referring to FIG. 6. FIG. 6 shows the solid line position of the axle 28 with the axle lying essentially in a horizontal plane, as is the situation where both wheels of the vehicle are resting on the ground and the vehicle is either traveling on a smooth horizontal surface or is stationary. A suspension of the present invention is attached to each of the left and right ends 96 and 98 of the axle. When the vehicle travels over uneven ground and the axle is subject to rocking, it can be seen in FIG. 6 that the right side of the axle raises and the left side of the axle is lowered. The transverse rod 50 allows the axle to rock and pivot about a virtual pivot point shown schematically as at 56 which is above the center of the axle at a vertical position generally corresponding to the centerline of the transverse rod. Accordingly, lateral loads exerted on the transverse rod from the axle rocking are substantially reduced, because lateral loads applied to the axle by the links are minimized, and since these loads are reacted by the rod 50, its loads are minimized.

When one of the wheels, for example the right wheel, lifts over an obstruction, such as a curb or a board in the roadway, the right side of the axle raises and the left side of the axle lowers only slightly. The virtual pivot point remains above the axle, along the centerline of the transverse rod so the lateral load is reduced, but the pivot point moves slightly left away from center of the axle. Thus, the virtual pivot point will move slightly as a result of different conditions causing the axle to rock.

The upward movement of, for example, the right end of the axle 28 causes the end of the axle to move through an arc, thereby causing the end of the axle to try to shift laterally to the left, as shown in FIG. 6. With prior art suspension systems, such as the leaf spring and beam suspension system, which do not allow for transverse motion, this shifting or attempting to shift places tremendous loads on the connection between the axle and the suspension member and between the suspension member and the forward pivot bracket or connection securely mounted on the frame rail. It is a unique feature of this invention that the resilient vertical link 14 with its pivotal mounting at its upper end 15 to the frame rail 11 allows the lower end 16 of the vertical link, which is connected to the forward end 17 of the rigid beam 18, to rock or swing laterally from the position shown in stolid line in FIG. 6 to the position shown in phantom, wherein the lower end of the vertical link maintains the perpendicular orientation with the front end of the beam. This freedom of motion reduces the stress on the axle, the suspension parts, and the frame rail as previously described so that all of those connecting members and the rigid beam itself may be made of lighter weight, lower strength materials while maintaining the structural integrity of the suspension linkages.

When the axle 28 pivots about the virtual pivot point 56 and the right end of the axle moves vertically and laterally, as shown in FIG. 6, the rigid beam 18 connected to the axle, as shown in FIG. 1, also moves vertically, whereby the shock absorber 38, airbag 36 and resilient vertical link 14 are compressed. However, the vertical deflection of the forward and rear ends 17 and 34 of the beam is not the same, because, for example the C-spring has a 9,000 lb/inch spring rate and the airbag and shock absorber have approximately a 700–800 lb/inch spring rate. As a result, in a fore-aft vertical plane generally parallel to the beam, the rigid beam and axle assembly pivots about a virtual pivot point shown schematically as at 100 in FIG. 1. In the preferred embodiment, the virtual pivot point 100 is approximately at the intersection of centerlines of the vertical link and the horizontal link. Because the pivot point 100 is a virtual pivot point and not a rigid, fixed pivot point as is used in the prior art, the lateral movement of the forward end 17 of the beam is not restricted, so lateral and torque loads cannot build up at the virtual pivot point. Accordingly, the lateral and torque loads on the beam, the axle, and the connection therebetween are greatly minimized, so the suspension has fewer components and the components are made of lighter weight material, thereby increasing the vehicle's maximum payload capacity.

While the invention has been described in detail with particular reference to preferred embodiments thereof, it will be understood that variations and modifications can be effected within the spirit and the scope of the invention as described hereinbefore and as defined in the appended claims. For example, the vertical link 14 need not be a flexible C-shape, but could be any resilient connecting member which allows the forward end of the stiff beam to rock freely in the transverse direction and freely in the vertical direction. Therefore, it is to be understood that the modifications and variations, and equivalents thereof, may be practiced while remaining within the spirit and scope of the invention as defined by the following claims.

I claim:

1. A stiff beam suspension system for use on a vehicle having a frame, the suspension system comprising:

a stiff beam having front and rear ends and a middle portion between the front and rear ends, the beam member being securely connected to an axle;

means coupled between the beam and the frame for resiliently supporting the frame on the axle and for dampening vibrations;

a horizontal link having forward and rearward ends, the horizontal link being coupled to the frame and to the axle, the horizontal link being adapted to control forward and rearward movement of the axle;

a resilient vertical link connected to the front end of the beam at a lower pivot connection and connected to the frame at an upper pivot connection, the resilient vertical link being adapted to allow the beam to move along at least two directional axes and to allow the beam to pivot about a pivot point remote from the front end of the beam, wherein the upper pivot connection between the resilient vertical link and the frame allows for pivoting of the resilient vertical link in a plane transverse to the frame, thereby maintaining a perpendicular relationship between the resilient vertical link at the lower pivot connection and the beam, so that lateral loads between the resilient vertical link and the beam are minimized; and means coupled between the axle and the frame to restrict lateral motion of the axle with respect to the frame.

2. The stiff beam suspension system of claim 1 wherein the resilient vertical link is C-shaped in a vertical plane.

3. The stiff beam suspension system of claim 2 wherein the C-shaped resilient vertical link is a spring having upper and lower ends and a concave portion facing rearwardly, and wherein the horizontal link extends into the concave portion forward beyond a line extending between the upper and lower ends of the C-shaped spring.

4. The stiff beam suspension system of claim 1 wherein the means to resiliently support the frame includes a main spring and a separate shock absorber.

5. The stiff beam suspension system of claim 1 wherein the main spring and shock absorber are connected to the beam at a position adjacent to the rear end of the beam.

6. The stiff beam suspension system of claim 1 wherein the beam is generally an I-beam in cross-section.

7. The stiff beam suspension system of claim 1 wherein the beam is a cast beam member.

8. The stiff beam suspension system of claim 1 wherein the beam has a seat portion on the middle portion that is adapted to receive and retain the axle so the axle is seated directly on the beam.

9. The stiff beam suspension system of claim 1, further comprising fastening means that engage the axle and the beam to securely fasten the axle on the middle portion of the beam.

10. The stiff beam suspension system of claim 1, further comprising at least one U-bolt that engages the axle and the beam, the at least one U-bolt having leg portions that extend through the beam and having U-bolt nuts attached to the leg portions of the U-bolt and secured against the beam.

11. The stiff beam suspension system of claim 1, further comprising a connecting member located on a top portion of the axle, the connecting member being pivotally connected to the horizontal link.

12. A trailing arm suspension system for a vehicle having a frame and at least one axle, comprising:

a stiff beam having front and rear end portions and an axle receiving portion between the front and rear ends, the axle receiving portion being adapted to receive an axle;

means coupled between the beam and the frame for resiliently supporting the frame on the axle and for dampening vibration;

a resilient vertical member being pivotally connected to the vehicle frame at an upper pivot connection and pivotally connected to the beam at a lower pivot connection, the resilient vertical member being oriented in a vertical plane and perpendicular to the beam, the resilient vertical member adapted to allow the beam member to move along at least two directional axes and to allow the beam to pivot about a pivot point remote from the front and rear ends of the beam member, wherein the upper pivot connection allows for pivoting of the resilient vertical link in a plane transverse to the frame, thereby maintaining a perpendicular relationship between the resilient vertical link at the lower pivot connection and the beam, so that lateral loads between the resilient vertical link and the beam are minimized;

a transverse link coupled to the axle and to the frame, the transverse link being transverse to the beam and adapted to control lateral movement of the axle;

a horizontal link having forward and rearward ends, the horizontal link being coupled to the frame and to the axle, the horizontal link being adapted to control forward and rearward movement of the axle; and fastening means connected to the axle and to the beam for securely fastening the axle to the beam.

13. The trailing arm suspension system of claim 12 wherein the resilient vertical link is C-shaped in a vertical plane.

14. The trailing arm suspension system claim 13 wherein the C-shaped resilient vertical link is a spring having upper and lower ends and a concave portion facing rearwardly, and wherein the horizontal link extends into the concave portion forward beyond a line extending between the upper and lower ends of the C-shaped spring.

15. The trailing arm suspension system claim 12 wherein the means to resiliently support the frame includes a main spring and a separate shock absorber.

16. The trailing arm suspension system of claim 12 wherein the beam is an I-beam.

17. The trailing arm suspension system of claim 12 wherein the beam is a cast beam member.

18. The trailing arm suspension system of claim 12, further comprising a second stiff beam having second front and rear end portions connected to the axle on a second end of the axle that is opposite the end of the axle connected to the first beam, the second ]beam having second axle receiving portion between the second front and rear ends, the second axle receiving portion being adapted to receive the axle;

second means coupled between the second beam and the frame for resiliently supporting the frame on the axle and for dampening vibration;

a second resilient vertical member being pivotally connected to the vehicle frame at a second upper pivot connection and pivotally connected to the second beam at a second lower pivot connection, the second resilient vertical member being oriented in a vertical plane and perpendicular to the second beam, the second resilient vertical member adapted to allow the second beam member to move along at least two directional axes and to allow the second beam to pivot about a second pivot point remote from the second front and rear ends of the second beam member, wherein the second upper pivot connection allows for pivoting of the second resilient vertical link in a second plane transverse to the frame, thereby maintaining a perpendicular relationship between the second resilient vertical link at the second lower pivot connection and the, second beam, so that lateral loads between the second resilient vertical link and the second beam are minimized;

a second horizontal link having forward and rearward ends, the second horizontal link being coupled to the frame and to the axle, the second horizontal link being adapted to control forward and rearward movement of the second end of the axle; and second fastening means connected to the axle and to the second beam for securely fastening the axle to the second beam.

19. The trailing arm suspension system of claim 18 wherein the second resilient vertical link is C-shaped in a vertical plane.

20. The trailing arm suspension system claim 19 wherein the second resilient vertical link is a second spring having upper and lower ends and a concave portion facing rearwardly, and wherein the second horizontal link extends into the concave portion forward beyond a line extending between the upper and lower ends of the second C-shaped spring.

21. The trailing arm suspension system claim 18 wherein the second means to resiliently support the frame includes a second main spring and a second separate shock absorber.

22. The trailing arm suspension system of claim 18 wherein the second beam is an I-beam.

23. The trailing arm suspension system of claim 18 wherein the second beam is a east beam member.

24. A vehicle suspension system, comprising:
   a vehicle frame;
   a resilient vertical link having an upper end and a lower end, said upper end being pivotally connected to said vehicle frame;
   a stiff beam having first and second ends and a middle seat portion between said first and second ends, said first end being pivotally connected to said lower end of said resilient vertical link;
   an axle being connected to said middle seat portion of said stiff beam;
   a vibration dampening device being connected to said stiff beam and to said vehicle frame; and
   a first rod having forward and rearward ends, said forward end being attached to said vehicle frame and said rearward end being attached to said axle above said stiff beam, said first rod being generally parallel to said vehicle frame.

25. The vehicle suspension system of claim 24 wherein said resilient vertical link is a C-shaped spring.

26. The vehicle suspension system of claim 25 wherein said first end of said stiff beam is a front end and said second end of said stiff beam is a rear end, and said C-shaped spring has a concave portion facing said rear end of said stiff beam and said forward end of said lust rod is positioned in said concave portion.

27. The vehicle suspension system of claim 24, further comprising a second rod being connected to said frame and to said axle, said second rod being generally transverse to said vehicle frame.

28. The vehicle suspension system of claim 27 wherein said second rod is connected to an inside portion of said vehicle frame and is connected to a central region of said axle.

* * * * *

UNITED STATES PATENT AND TRADEMARK OFFICE
CERTIFICATE OF CORRECTION

PATENT NO. : 5,427,404
DATED : June 27, 1995
INVENTOR(S) : Donald L. Stephens

It is certified that error appears in the above-indentified patent and that said Letters Patent is hereby corrected as shown below:

In column 9, claim 18, line 7, please delete "]beam" and substitute therefore --beam--.

In column 9, claim 18, line 30, after the second occurrence of "the", please delete ",".

In column 10, claim 23, line 12, please delete "east" and substitute therefore --cast--.

In column 10, claim 26, line 39, please delete "lust" and substitute therefore --first--.

Signed and Sealed this

Twenty-first Day of November, 1995

*Attest:*

BRUCE LEHMAN

*Attesting Officer*     *Commissioner of Patents and Trademarks*